Patented Aug. 4, 1936

2,050,195

UNITED STATES PATENT OFFICE 2,050,195

ACCELERATORS OF VULCANIZATION

Lorin B. Sebrell, Silver Lake, Ohio, assignor to Wingfoot Corporation, Wilmington, Del., a corporation of Delaware No Drawing. Application March 1, 1932, Serial No. 596,145. Renewed January 25, 1934

2 Claims. (Cl. 260—53)

This invention is predicated upon the discovery that when the mercapto aromatic thiazoles are reacted with the primary aliphatic monamines, particularly those which are completely saturated, the reaction products so obtained, constituting new compounds in and of themselves, are vulcanization accelerators of marked value, being in many cases even more powerful than the thiazoles from which they are derived. These substances may be obtained by the simple expedient of adding the desired primary aliphatic monamine to a solution of the desired mercapto aromatic thiazole in alcohol or other solvent at normal room temperatures.

The following are illustrative examples of mercapto aromatic thiazoles which may be employed: mercaptobenzothiazole, 2-mercapto 4-phenyl thiazole, 6-methyl mercaptobenzothiazole, 5 or 6-chloro mercaptobenzothiazole, 2-mercapto 4-phenyl mercaptobenzothiazole, and 6-amido mercaptobenzothiazole. Completely saturated primary aliphatic monamines with which such mercapto aromatic thiazoles will react are, for example, propyl amine, heptyl amine, iso butyl amine, amino cyclohexyl ethyl ether, cyclohexyl amine, isoamylamine, and normal butyl amine.

In the reaction of these primary aliphatic monamines with mercapto aromatic thiazoles, the nitrogen atom of the amino group is apparently added directly to the sulphur in the mercaptan group. For example, the reaction between butyl amine and mercaptobenzothiazole may be expressed as follows:

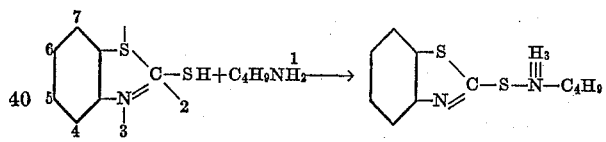

That between cyclohexyl amine and mercaptobenzothiazole may be represented in the following manner:

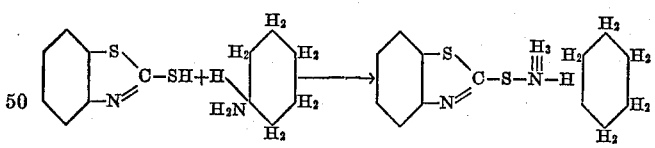

Inasmuch as certain primary aliphatic monamines, such as propyl amine, are relatively volatile in nature, the reaction products thereof with mercaptobenzothiazole or its derivatives are often relatively easily decomposed when incorporated in rubber. For that reason, these materials are not adapted for milling into solid rubber in the ordinary processes of manufacturing such stocks as those employed in vehicle tires and tubes. These relatively volatile compounds may, however, be readily employed as accelerators in rubber cements and compounded latices.

As has been pointed out above, these materials are readily obtained by adding one mol. of the desired primary aliphatic monamine to an alcoholic solution of one mol. of the desired mercapto aromatic thiazole at normal room temperatures (approximately 35 degrees C.). The reaction product crystallizes out of the alcohol in relatively pure form. In the case of the cyclohexyl ammonium benzothiazyl mono sulphide obtained from the cyclohexyl amine and mercaptobenzothiazole as above indicated, the product separates as white crystals, having the melting point of 155 to 157 degrees C. The normal butyl ammonium 6-nitro benzothiazyl mono sulphide is obtained as a red crystalline substance having a melting point of 113 to 115 degrees C.

The following is an example of a formula in which reaction products other than those obtained from the more volatile primary aliphatic monamines may be employed.

|  | Parts |
|---|---|
| Rubber | 100 |
| Zinc oxide | 5 |
| Sulfur | 3 |
| Stearic acid | 1.5 |
| Accelerator | .5 |

To test the value of these new materials as accelerators, samples prepared in accordance with the above formula were subjected to vulcanization for varying periods of time. These samples were then subjected to physical tests to ascertain the elasticity and tensile strength thereof, the results of a few of these tests being indicated in the following tables:

| Cure | | | | Stress in kgs./cm.² at | |
|---|---|---|---|---|---|
| Time in mins. | Temp. F.° | Kgs./cm.² tensile | Percent elong. | 500% elong. | 700% elong. |
| Cyclo hexyl ammonium benzothiazyl mono sulphide | | | | | |
| 20 | 260 | 196 | 705 | 43 | 188 |
| 40 | 260 | 210 | 680 | 57 | -------- |
| 80 | 260 | 216 | 685 | 58 | -------- |
| 60 | 285 | 152 | 685 | 45 | -------- |
| Butyl ammonium benzothiazyl mono sulphide | | | | | |
| 20 | 260 | 184 | 745 | 30 | 140 |
| 40 | 260 | 206 | 730 | 40 | 174 |
| 80 | 260 | 202 | 715 | 44 | 186 |
| 60 | 285 | 170 | 730 | 46 | 139 |
| Butyl ammonium 6-nitro benzothiazyl mono sulphide | | | | | |
| 20 | 260 | 200 | 740 | 40 | 157 |
| 40 | 260 | 214 | 740 | 39 | 166 |
| 80 | 260 | 193 | 725 | 40 | 162 |
| 60 | 285 | 180 | 770 | 31 | 119 |

From this it will be seen that these materials are powerful accelerators which, when used in rubber, give rise to compounds of great tensile strength, elasticity and durability. Further, such materials are substantially non-toxic when employed in the amounts used in rubber stocks. They are also very readily prepared.

It will be understood that the details of the invention may be varied within comparatively wide limits without departing from the inventive concept and that it is therefore desired to embrace within the scope of this invention such modifications and changes as may be necessary to adapt it to varying conditions and uses. It is intended that the patent shall cover, by suitable expression in the appended claims, whatever features of patentable novelty reside in the invention.

What I claim is:

1. As a new chemical compound, N-cyclohexyl ammonium benzothiazyl mono sulphide.

2. As a new chemical compound, a primary cyclohexyl ammonium benzothiazyl mono sulphide.

LORIN B. SEBRELL.